United States Patent
McGregor et al.

(10) Patent No.: US 10,956,569 B2
(45) Date of Patent: Mar. 23, 2021

(54) PROACTIVE RANSOMWARE DEFENSE

(71) Applicant: International Business Machines Corporation, Armonk, NY (US)

(72) Inventors: Harry R. McGregor, Tucson, AZ (US); Christopher B. Moore, Vail, AZ (US); Oded Margalit, Ramat Gan (IL); Itzhack Goldberg, Hadera (IL)

(73) Assignee: International Business Machiness Corporation, Armonk, NY (US)

( * ) Notice: Subject to any disclaimer, the term of this patent is extended or adjusted under 35 U.S.C. 154(b) by 229 days.

(21) Appl. No.: 16/124,140

(22) Filed: Sep. 6, 2018

(65) Prior Publication Data
US 2020/0082074 A1   Mar. 12, 2020

(51) Int. Cl.
*G06F 21/00* (2013.01)
*G06F 21/56* (2013.01)
*H04L 9/14* (2006.01)
*G06F 21/62* (2013.01)

(52) U.S. Cl.
CPC .......... *G06F 21/56* (2013.01); *G06F 21/6218* (2013.01); *H04L 9/14* (2013.01); *G06F 2221/034* (2013.01)

(58) Field of Classification Search
CPC ............. G06F 21/56; G06F 21/6218; G06F 2221/034; H04L 9/14
See application file for complete search history.

(56) References Cited

U.S. PATENT DOCUMENTS

| 6,185,681 | B1 | 2/2001 | Zizzi |
| 8,782,403 | B1 | 7/2014 | Satish et al. |
| 9,537,886 | B1 | 1/2017 | Gareau |
| 10,503,897 | B1 * | 12/2019 | Striem-Amit ......... G06F 21/552 |
| 2002/0166064 | A1 * | 11/2002 | Harrison .......... G11B 20/00094 726/10 |

(Continued)

FOREIGN PATENT DOCUMENTS

EP   3151147 A1   4/2017

OTHER PUBLICATIONS

Patyal et al. "Multi-Layered Defense Architecture against Ransomware." International Journal of Business & Cyber Security (IJBCS) vol. 1, Issue 2, Jan. 2017.

(Continued)

*Primary Examiner* — Sarah Su
(74) *Attorney, Agent, or Firm* — Nelson and Nelson; Daniel P. Nelson

(57) ABSTRACT

A method for defending a computing system against ransomware attacks is disclosed. In one embodiment, such a method includes identifying, on a computing system, files to be protected against ransomware attacks. The method appends a public key to each of the files. Upon receiving a request to modify a specific file, the method reads the public key appended to the file, requests an authentication token from a user, and computes a private key associated with the files. The method combines the public key, authentication token, and private key to generate an unlock key. This unlock key is compared to a validation key. The method authorizes modification of the file in the event the unlock key matches the validation key. A corresponding system and computer program product are also disclosed.

20 Claims, 7 Drawing Sheets

(56) References Cited

U.S. PATENT DOCUMENTS

| | | | |
|---|---|---|---|
| 2008/0092235 A1* | 4/2008 | Comlekoglu | G06F 21/554 |
| | | | 726/22 |
| 2009/0241197 A1 | 9/2009 | Troyansky | |
| 2014/0007228 A1 | 1/2014 | Ngair | |
| 2015/0220745 A1 | 8/2015 | Nellitheertha et al. | |
| 2016/0180087 A1* | 6/2016 | Edwards | G06F 21/566 |
| | | | 726/24 |
| 2017/0091453 A1 | 3/2017 | Cochin | |
| 2017/0177867 A1* | 6/2017 | Crofton | G06F 21/565 |
| 2018/0176197 A1* | 6/2018 | Matthews | H04L 63/0807 |
| 2019/0266327 A1* | 8/2019 | Satpathy | G06F 21/566 |
| 2019/0332769 A1* | 10/2019 | Fralick | H04L 9/30 |

OTHER PUBLICATIONS

Ahmadian et al., "Connection-Monitor & Connection-Breaker: A Novel Approach for Prevention and Detection of High Survivable Ransomwares." 2015 12th International Iranian Society of Cryptology Conference on Information Security and Cryptology (ISCISC), IEEE, Sep. 2015.

\* cited by examiner

PROACTIVE RANSOMWARE DEFENSE

BACKGROUND

Field of the Invention

This invention relates to systems and methods for defending against ransomware attacks.

Background of the Invention

Malicious computer software (also referred to as "malware") such as viruses, computer worms, and Trojans, continues to pose a significant threat to computer privacy and security. Malware is any software designed with the intention to cause damage to a computer, server, or computer network. Malware typically causes damage after it is implanted or installed on a target's computer. The manner in which the malware is implanted or installed may vary. The malware may take various forms, including executable code, scripts, active content, and the like. Malware differs from software bugs in that the malware has a malicious intent, acting against the interests of the computer user, as opposed to causing unintentional harm.

In recent years, a new type of malicious software, referred to as ransomware, has become more prevalent. Ransomware is a type of malware that restricts access to an infected computer system and demands that a computer system user pay a ransom to an originator of the malware in order to remove the restriction. Ransomware typically propagates as a Trojan having a payload that appears to be a legitimate file. This may trick a user into unwittingly downloading and/or opening the file, which in turn launches the ransomware on the user's computer. The ransomware may infect the user's computer as well as potentially other computers or devices connected to the user's computer.

Certain forms of ransomware may restrict access to a computer system by encrypting files on the computer system. These files may only be decrypted by paying a ransom to the originator of the malware. Recovering the files without the decryption key is typically infeasible. Thus, the best solution is to prevent ransomware from encrypting files in the first place.

In view of the foregoing, what are needed are systems and methods to defend against ransomware attacks, and more specifically against ransomware's attempts to encrypt a user's files. Ideally, such systems and methods will take a proactive approach by preventing ransomware from encrypting files in the first place.

SUMMARY

The invention has been developed in response to the present state of the art and, in particular, in response to the problems and needs in the art that have not yet been fully solved by currently available systems and methods. Accordingly, systems and methods have been developed to proactively defend against ransomware attacks. The features and advantages of the invention will become more fully apparent from the following description and appended claims, or may be learned by practice of the invention as set forth hereinafter.

Consistent with the foregoing, a method for defending a computing system against ransomware attacks is disclosed. In one embodiment, such a method includes identifying, on a computing system, files to be protected against ransomware attacks. The method appends a public key to each of the files. Upon receiving a request to modify a specific file, the method reads the public key appended to the file, requests an authentication token from a user, and computes a private key associated with the files. The method combines the public key, authentication token, and private key to generate an unlock key. This unlock key is compared to a validation key. The method authorizes modification of the file in the event the unlock key matches the validation key.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the embodiments of the invention will be described and explained with additional specificity and detail through use of the accompanying drawings, in which.

DETAILED DESCRIPTION

Figure 1:
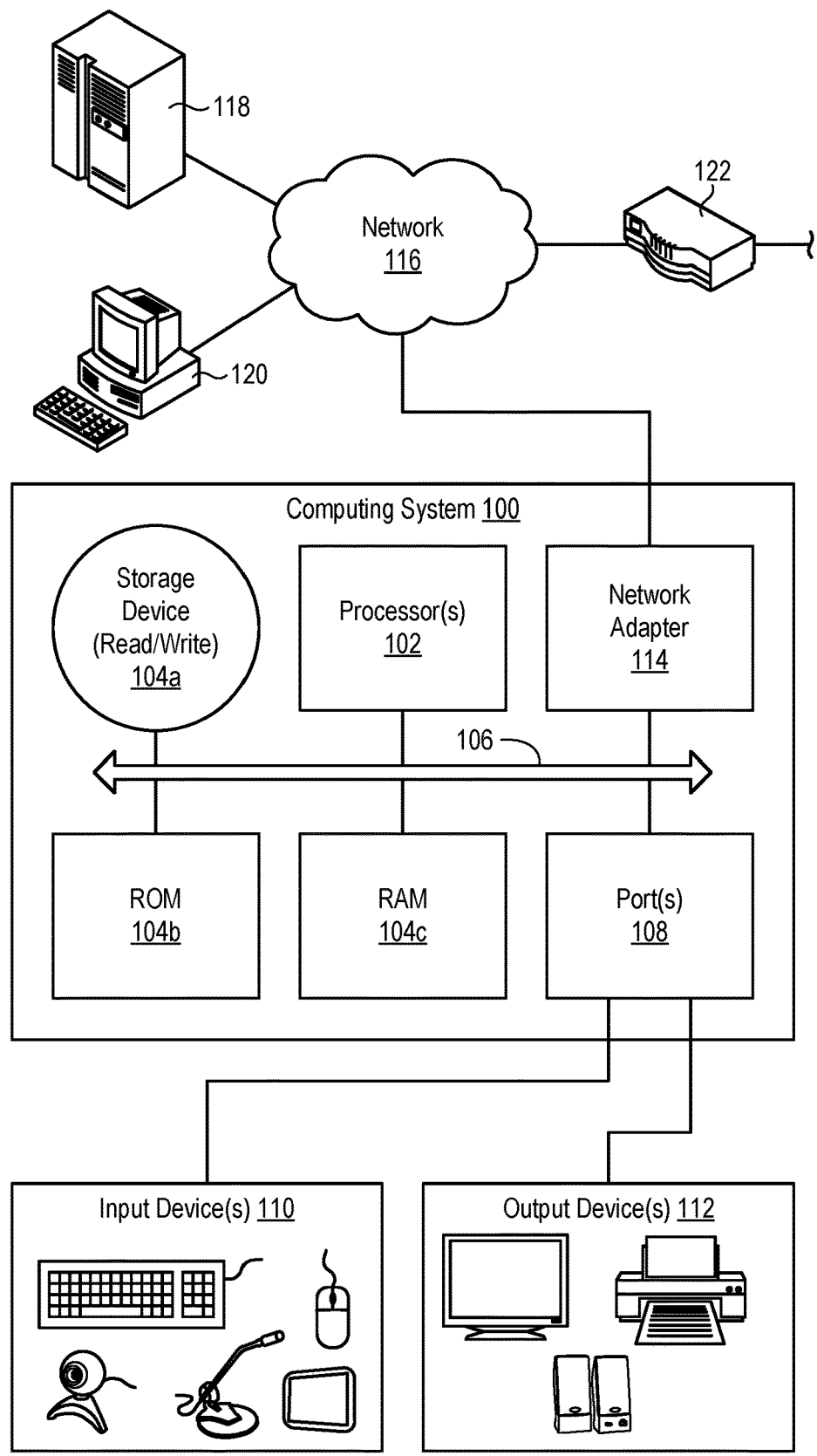
FIG. 1 is a high-level block diagram showing one example of a computing system that may be used to implement the disclosed systems and methods for defending against ransomware attacks.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a computing system 100 is illustrated. The computing system 100 is presented to show one example of an environment where systems and methods in accordance with the invention may be implemented. The computing system 100 may be embodied as a desktop computer, a workstation, a laptop computer, a server, a storage controller, a mobile device 100 such as a smart phone or tablet, or the like. The computing system 100 is presented by way of example and is not intended to be limiting. Indeed, the systems and methods disclosed herein may be applicable to a wide variety of different computing systems in addition to the computing system 100 shown. The systems and methods disclosed herein may also potentially be distributed across multiple computing systems 100.

As shown, the computing system 100 includes at least one processor 102 and may include more than one processor 102. The processor 102 may be operably connected to a memory 104. The memory 104 may include one or more non-volatile storage devices such as hard drives 104a, solid state drives 104a, CD-ROM drives 104a, DVD-ROM drives 104a, tape drives 104a, or the like. The memory 104 may also include non-volatile memory such as a read-only memory 104b (e.g., ROM, EPROM, EEPROM, and/or Flash ROM) or volatile memory such as a random access memory 104c (RAM or operational memory). A bus 106, or plurality of buses 106, may interconnect the processor 102, memory devices 104, and other devices to enable data and/or instructions to pass therebetween.

To enable communication with external systems or devices, the computing system 100 may include one or more ports 108. Such ports 108 may be embodied as wired ports 108 (e.g., USB ports, serial ports, Firewire ports, SCSI ports, parallel ports, etc.) or wireless ports 108 (e.g., Bluetooth, IrDA, etc.). The ports 108 may enable communication with one or more input devices 110 (e.g., keyboards, mice, touchscreens, cameras, microphones, scanners, storage devices, etc.) and output devices 112 (e.g., displays, monitors, speakers, printers, storage devices, etc.). The ports 108 may also enable communication with other computing systems 100.

In certain embodiments, the computing system 100 includes a wired or wireless network adapter 114 to connect the computing system 100 to a network 116, such as a local area network (LAN), wide area network (WAN), storage area network (SAN), or the Internet. Such a network 116 may enable the computing system 100 to connect to or communicate with one or more servers 118, workstations 120, personal computers 120, mobile computing devices, or other devices. The network 116 may also enable the computing system 100 to connect to or communicate with another network by way of a router 122 or other device 122. Such a router 122 may allow the computing system 100 to communicate with servers, workstations, personal computers, or other devices located on different networks.

Figure 2:
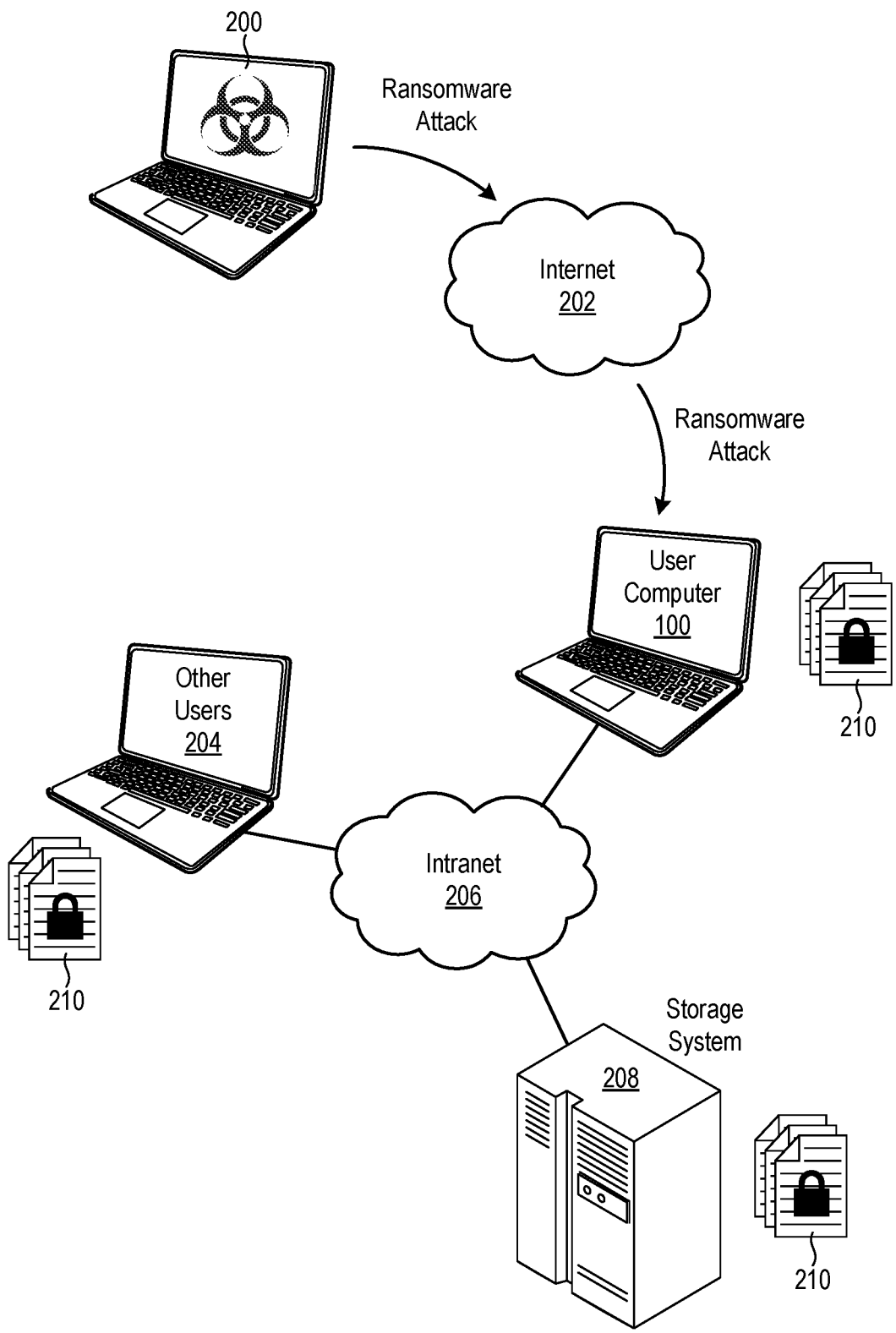
FIG. 2 is a high-level block diagram showing one example of a ransomware attack.

Referring to FIG. 2, as previously mentioned, malicious computer software (also referred to as "malware") such as viruses, computer worms, and Trojans, continues to pose a significant threat to computer privacy and security. Malware is defined herein as including any software designed with the intention of causing damage to a computer, server, computer network, or the like. Malware typically causes damage after it is implanted or installed onto a target's computer. The manner in which the malware is implanted or installed may vary. The malware may take on various forms, including executable code, scripts, active content, and the like.

In recent years, a new type of malicious software, referred to as ransomware, has become more prevalent. Ransomware is a type of malware that restricts access to an infected computer system and demands that a computer system user pay a ransom to an originator of the malware in order to remove the restriction. Ransomware typically propagates as a Trojan having a payload that appears to be a legitimate file. This may trick a user into unwittingly downloading and opening the file, which in turn launches the ransomware on the user's computer. The ransomware may infect the user's computer as well as other computers and devices connected to the user's computer.

Certain forms of ransomware may restrict access to a computer system by encrypting files on the computer system. These files may only be decrypted by paying a ransom to the originator of the malware. Recovering the files without the decryption key is typically infeasible.

FIG. 2 shows one example of a ransomware attack that uses file encryption as a way to extort a ransom from one or more users of computing systems. As shown in FIG. 2, an attacker 200 may propagate malicious ransomware onto the Internet 202 or other networks 202. In certain cases, the ransomware is distributed by way of a Trojan that appears to be a legitimate file. A user may be tricked into downloading or opening the ransomware when it arrives as an email attachment or as a message from a social networking site. In other cases, the ransomware may travel automatically between computers without user interaction. For example, the ransomware may attack computers that are already part of a botnet (a group of infected computers under control of a botmaster). This further infects the computers with the ransomware. In yet other cases, ransomware may be installed on a computing system 100 when a user of the computing system 100 visits a compromised website.

Once the ransomware is executed on a user's computing system 100, the ransomware may encrypt files 210 located on the computing system 100, thereby preventing the user from accessing the files 210. In certain cases, the ransomware may also propagate to other computing systems 204 connected to the computing system 100, such as over an intranet 206 such as a local area network 206. These other computing system 204 may also have their files 210 encrypted by the ransomware. In certain cases, the computing systems 100, 204 may have access to files 210 on external storage systems 208. These files 210 are also at risk to being encrypted by the ransomware.

Once encrypted, the only feasible way for the user to regain access to the files 210 is often to pay the ransom. To prevent such situations, the best solution is to prevent ransomware from encrypting files 210 in the first place. Thus, systems and methods are needed to defend against ransomware attacks, and more particularly against ransomware's attempts to encrypt a user's files. Ideally, such systems and methods will take a proactive approach by preventing ransomware from encrypting files in the first place.

Figure 3:
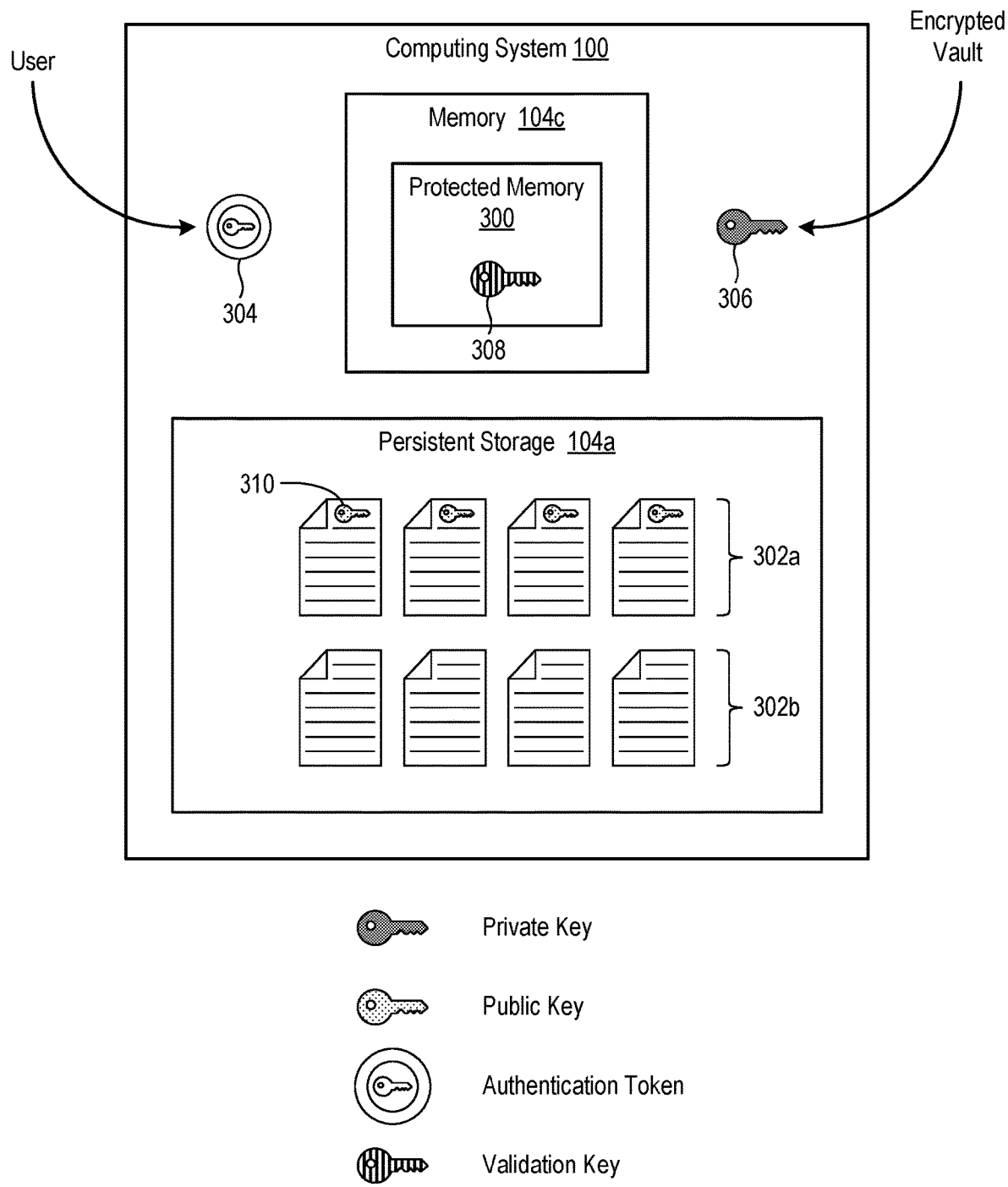
FIG. 3 is a high-level block diagram showing various keys and tokens that may be used by systems and methods in accordance with the invention.

Referring to FIG. 3, one embodiment of a system and methodology for preventing ransomware from encrypting files 302 on a user's computing system 100 is illustrated. These systems and methods work to prevent undesired encryption of innoculated files 302a using an authentication mechanism to control file modification. This mechanism ensures that an owner or administrator 206 of data explicitly allows or disallows changes to protected files 302a using information that is not contained on the computing system 100. This makes it very difficult for ransomware to make changes to protected files 302a and prevents unwanted file encryption and/or removal.

As shown, in FIG. 3, systems and methods in accordance with the invention may utilize an asymmetrical key pair comprising a public key 310 and private key 306, as well as an authentication token 304 created by a user. The authentication token 304 may be created by the user at the time of key pair generation. The authentication token 304 may take the form of a password, PIN number, other standard authentication input such as biometric data. The authentication token 304 may be incorporated into the asymmetrical key pair and be used to complete the asymmetrical key to enable modification of files 302 on the user's computing system 100.

As shown in FIG. 3, in certain embodiments, selected files 302a on a computing system 100 may be pre-pended with the public key 310 that corresponds to the key pair. Other files 302b for which ransomware protection is not desired may be left without the public key 310. When attempts are made to modify a file 302, systems and methods in accordance with the invention may check the file 302 for the pre-pended public key 310. If the public key 310 is present, the system may disallow any modifications (e.g., updates, deletion, encryption, etc.) without going through the authentication process disclosed herein. This may occur for all user account types on the computing system 100 including the system root. On the other hand, less critical actions such as moving innoculated files 302a may be allowed without authentication as long as movement is restricted, for example, to local block storage devices.

Figure 4:
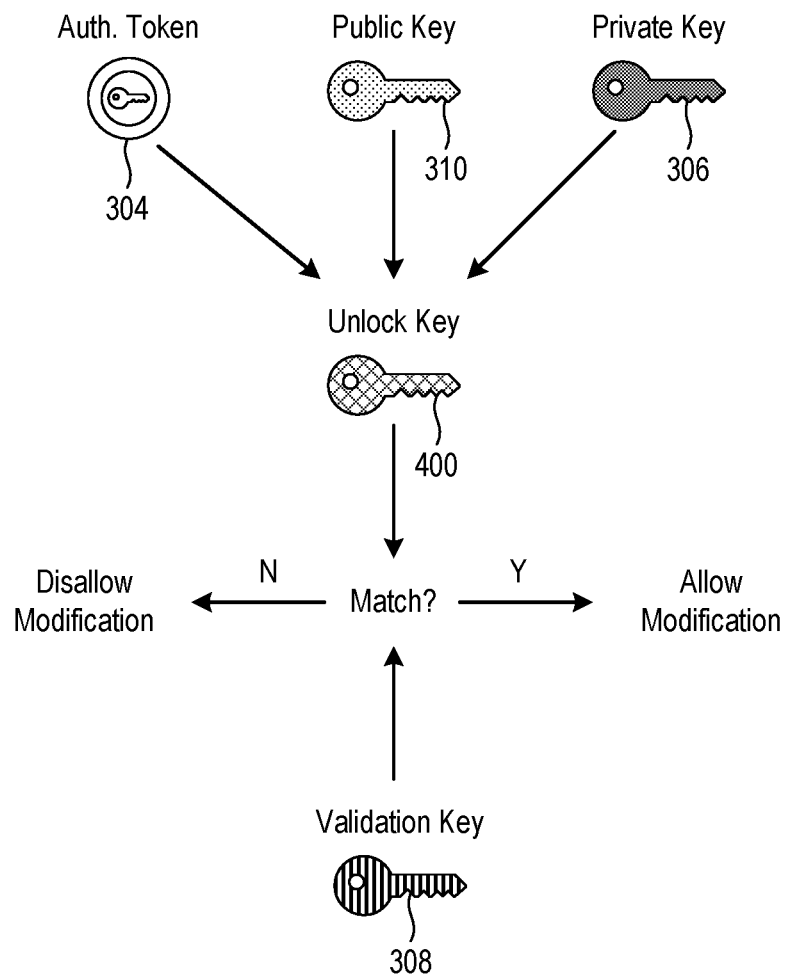
FIG. 4 shows how the keys and tokens described in FIG. 3 may be used to allow/disallow modification of a file.

Referring to FIG. 4, while continuing to refer generally to FIG. 3, in certain embodiments, when an attempt is made to modify a file 302a pre-pended with the public key 310, a request may be sent to a user for the authentication token 304. The private key 306 may also be computed, which may include retrieving the private key 306 from an encrypted vault maintained in association with a private key manager. The authentication token 304, public key 310, and private key 306 may be combined to generate an unlock key 400, as shown in FIG. 4. This unlock key 400 may be compared against a validation key 308. In certain embodiments, the validation key 308 is retrieved from protected memory 300 (e.g., kernel read-only memory space). In other embodiments, the validation key 308 is retrieved in an encrypted form from unprotected memory. In such embodiments, the unlock key 400 may be used to decrypt the validation key 308. In other embodiments, the validation key 308 is derived from a small part of the unlock key 400.

As shown in FIG. 4, if the unlock key 400 matches the validation key 308, the request to modify the file 302a may be allowed (e.g., by performing the requested updating, deleting, and/or encrypting of the file 302a). By contrast, if the unlock key 400 does not match the validation key 308, the request to modify the file 302 may be disallowed. In the event the file 302a is modified, the system may check the file 302a after the modification to ensure that the public key 310 is still present at the beginning of the file 302a. If not or the public key 310 has been modified in some way, the system may reapply the pre-pended public key 310.

Figure 5:
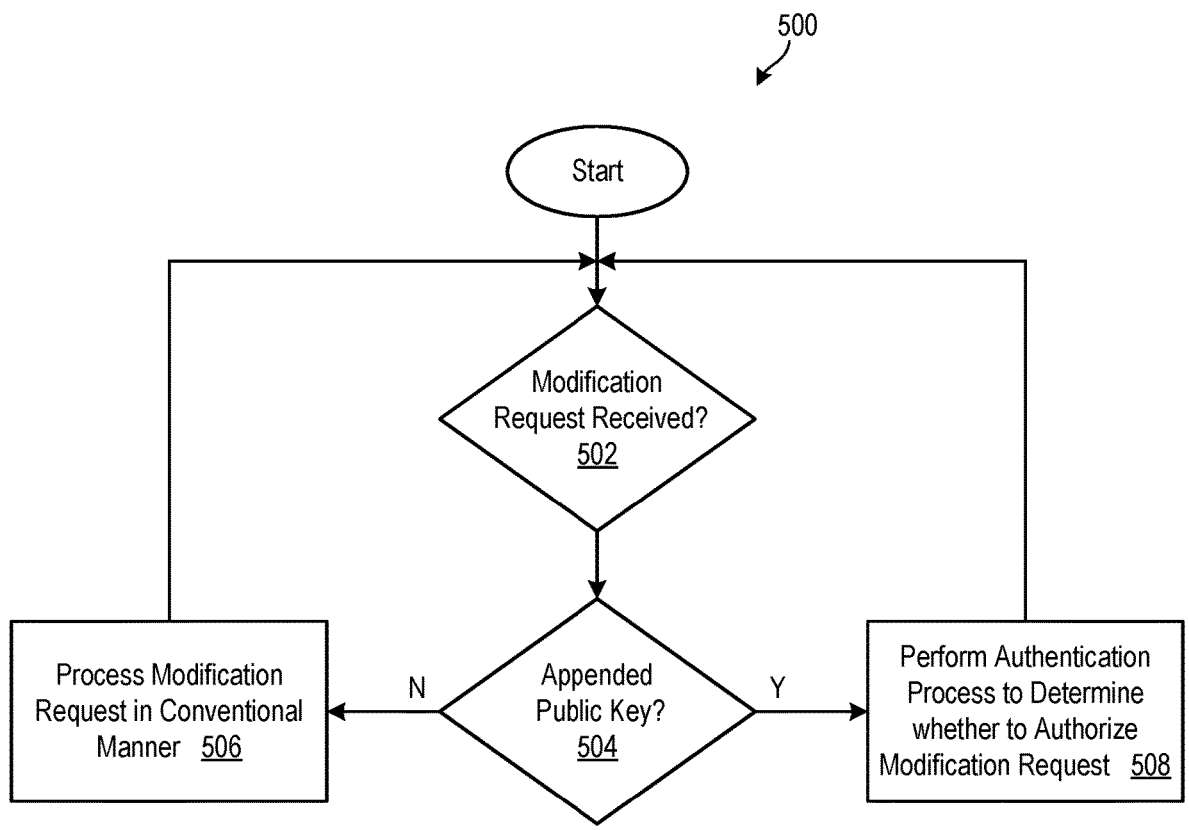
FIG. 5 shows one embodiment of a method for determining when to use systems and methods in accordance with the invention.

Referring to FIG. 5, one embodiment of a method 500 to determine when to utilize systems and methods in accordance with the invention is illustrated. As shown, when a modification request for a specific file 302 is received at step 502, the method 500 determines 504 whether the specific file 302 has a public key 310 appended thereto. If not, the file 302 is not innoculated against ransomware and the method 500 processes 506 the modification request in the conventional manner. If, on the other hand, the file 302 has a public key 310 appended thereto, the method 500 performs 508 an authentication process to determine whether to process the modification request. Such an authentication process will be discussed in association with FIG. 6.

Figure 6:
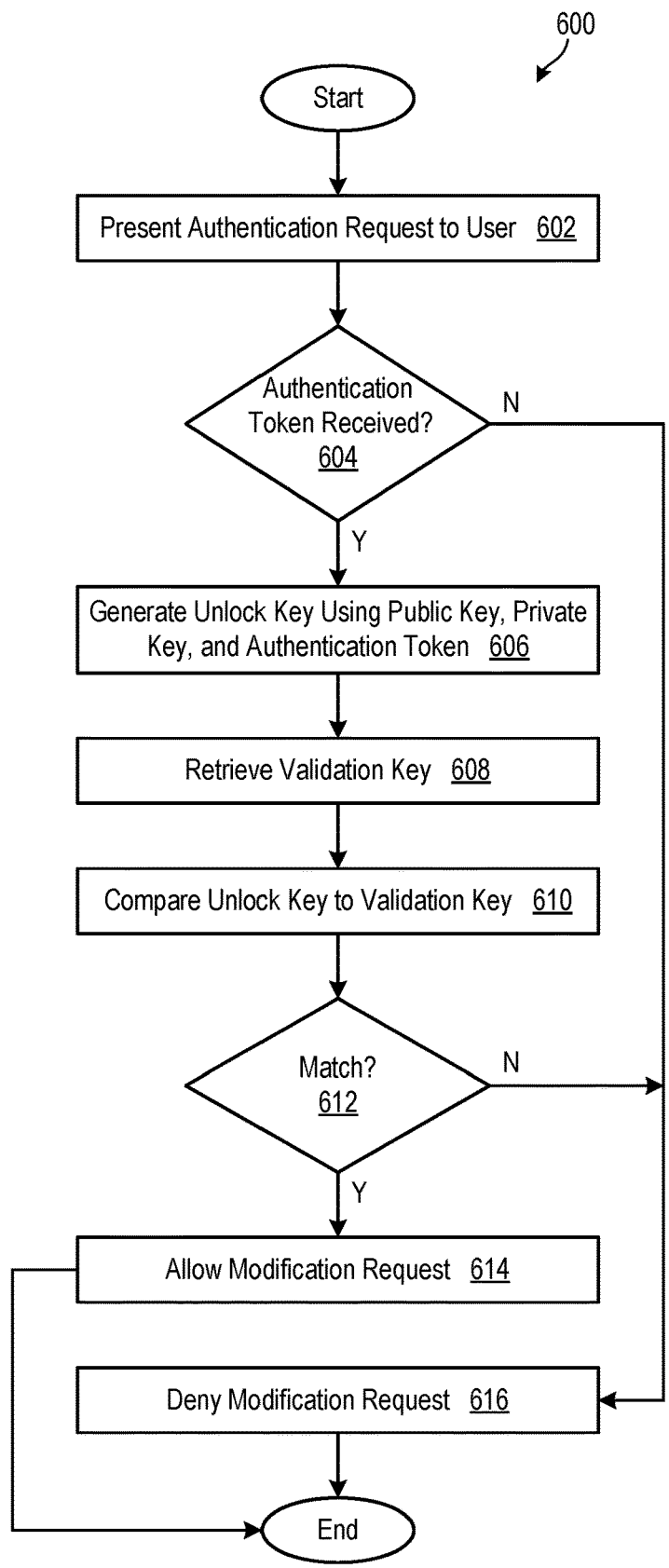
FIG. 6 shows one embodiment of a method for allowing/disallowing modification of a file using systems and methods in accordance with the invention.

Referring to FIG. 6, one embodiment of a method 600 for allowing/disallowing modification of an innoculated file 302a is illustrated. As shown, when a request is received to modify an innoculated file 302a on a computing system 100, the method 600 presents 602 an authentication request to a user of the computing system 100. If an authentication token 304 is not received from the user at step 604, the method 600 denies 616 the modification request.

If, on the other hand, a authentication token 304 is received at step 604, the method 600 generates 606 an unlock key 400 using the public key 310, private key 306, and authentication token 304. The method 600 also retrieves 608 the validation key 308. The validation key 308 may be retrieved from protected storage such as protected memory 300, or the validation key 308 may be retrieved from uprotected storage and decrypted using, for example, the unlock key 400. The method 600 then compares 610 the unlock key 400 to the validation key 308 to determine if they match. If the unlock key 400 matches the validation key 308, the method 600 allows 614 execution of the modification request. If, on the other hand, the unlock key 400 does not match the validation key 308, the method 600 denies 616 execution of the modification request.

Figure 7:
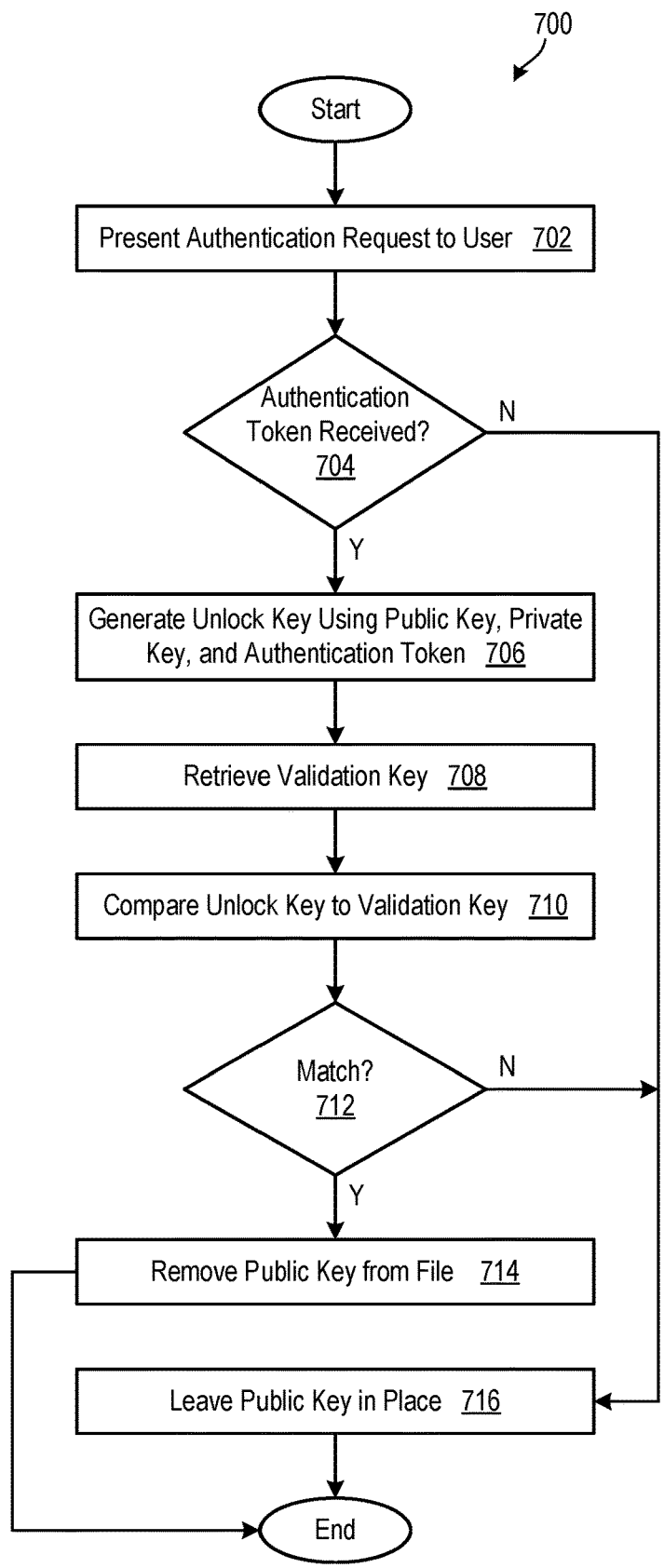
FIG. 7 shows one embodiment of a method for disabling or reversing ransomware protections provided by systems and methods in accordance with the invention.

Referring to FIG. 7, one embodiment of a method 700 for disabling or reversing the disclosed ransomware protection is illustrated. As shown, when a request is received to remove or disable the ransomware protection for a file 302a, the method 700 presents 702 an authentication request to a user of the computing system 100 hosting the innoculated file 302a. If an authentication token 304 is not received from the user at step 704, the method 700 denies the removal by leaving 716 the public key 310 in place.

If an authentication token 304 is received at step 704, the method 700 generates 706 an unlock key 400 using the public key 310, private key 306, and authentication token 304. The method 700 also retrieves 708 the validation key 308. The validation key 308 may be retrieved from protected memory 300 or decrypted using the unlock key 400 as previously discussed. The method 700 then compares 710 the unlock key 400 to the validation key 308 to determine if they match. If the unlock key 400 matches the validation key 308 at step 712, the method 700 removes 714 the public key 310 from the file 302a. This disables the ransomware protection associated with the file 302a. If, on the other hand, the unlock key 400 does not match the validation key 308, the method 700 leaves 716 the public key 310 in place for the file 302a. This retains the ransomware protection for the file 302a.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other implementations may not require all of the disclosed steps to achieve the desired functionality. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for defending a computing system against ransomware attacks, the method comprising:
   identifying, on a computing system, a plurality of files to be protected against ransomware attacks;
   appending a public key to each of the plurality of files;
   upon receiving a request to modify a specific file of the plurality of files, reading the public key appended to the specific file, requesting an authentication token from a user, and computing a private key associated with the plurality of files;
   combining the public key, authentication token, and private key to generate an unlock key;
   comparing the unlock key to a validation key; and
   authorizing modification of the specific file in the event the unlock key matches the validation key.

2. The method of claim 1, wherein the validation key is stored in a protected memory space.

3. The method of claim 1, wherein the validation key is decrypted prior to being compared to the unlock key.

4. The method of claim 1, wherein computing the private key comprises retrieving the private key from an encrypted vault.

5. The method of claim 1, wherein authorizing modification comprises authorizing deletion of the specific file.

6. The method of claim 1, wherein authorizing modification comprises authorizing encryption of the specific file.

7. The method of claim 1, further comprising disallowing modification of the specific file in the event the unlock key does not match the validation key.

8. A computer program product for defending a computing system against ransomware attacks, the computer program product comprising a computer-readable storage medium having computer-usable program code embodied therein, the computer-usable program code configured to perform the following when executed by at least one processor:
- identify, on a computing system, a plurality of files to be protected against ransomware attacks;
- append a public key to each of the plurality of files;
- upon receiving a request to modify a specific file of the plurality of files, read the public key appended to the specific file, request an authentication token from a user, and compute a private key associated with the plurality of files;
- combine the public key, authentication token, and private key to generate an unlock key;
- compare the unlock key to a validation key; and
- authorize modification of the specific file in the event the unlock key matches the validation key.

9. The computer program product of claim 8, wherein the validation key is stored in a protected memory space.

10. The computer program product of claim 8, wherein the validation key is decrypted prior to being compared to the unlock key.

11. The computer program product of claim 8, wherein computing the private key comprises retrieving the private key from an encrypted vault.

12. The computer program product of claim 8, wherein authorizing modification comprises authorizing deletion of the specific file.

13. The computer program product of claim 8, wherein authorizing modification comprises authorizing encryption of the specific file.

14. The computer program product of claim 8, wherein the computer-usable program code is further configured to disallow modification of the specific file in the event the unlock key does not match the validation key.

15. A system for defending against ransomware attacks, the system comprising:
- at least one processor;
- at least one memory device operably coupled to the at least one processor and storing instructions for execution on the at least one processor, the instructions causing the at least one processor to:
  - identify, on a computing system, a plurality of files to be protected against ransomware attacks;
  - append a public key to each of the plurality of files;
  - upon receiving a request to modify a specific file of the plurality of files, read the public key appended to the specific file, request an authentication token from a user, and compute a private key associated with the plurality of files;
  - combine the public key, authentication token, and private key to generate an unlock key;
  - compare the unlock key to a validation key; and
  - authorize modification of the specific file in the event the unlock key matches the validation key.

16. The system of claim 15, wherein the validation key is stored in a protected memory space.

17. The system of claim 15, wherein the validation key is decrypted prior to being compared to the unlock key.

18. The system of claim 15, wherein computing the private key comprises retrieving the private key from an encrypted vault.

19. The system of claim 15, wherein authorizing modification comprises authorizing deletion of the specific file.

20. The system of claim 15, wherein authorizing modification comprises authorizing encryption of the specific file.

* * * * *